Figure 4:
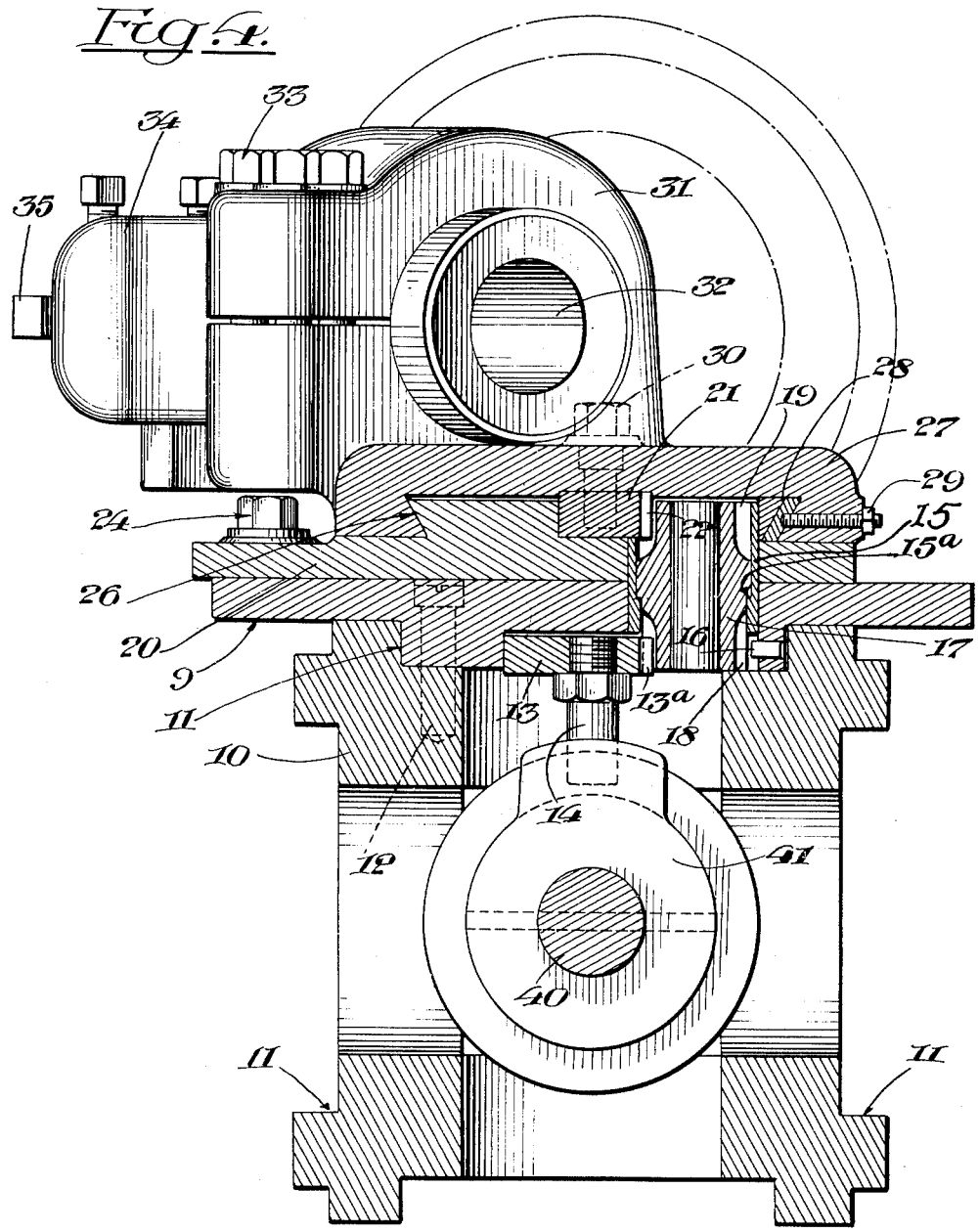

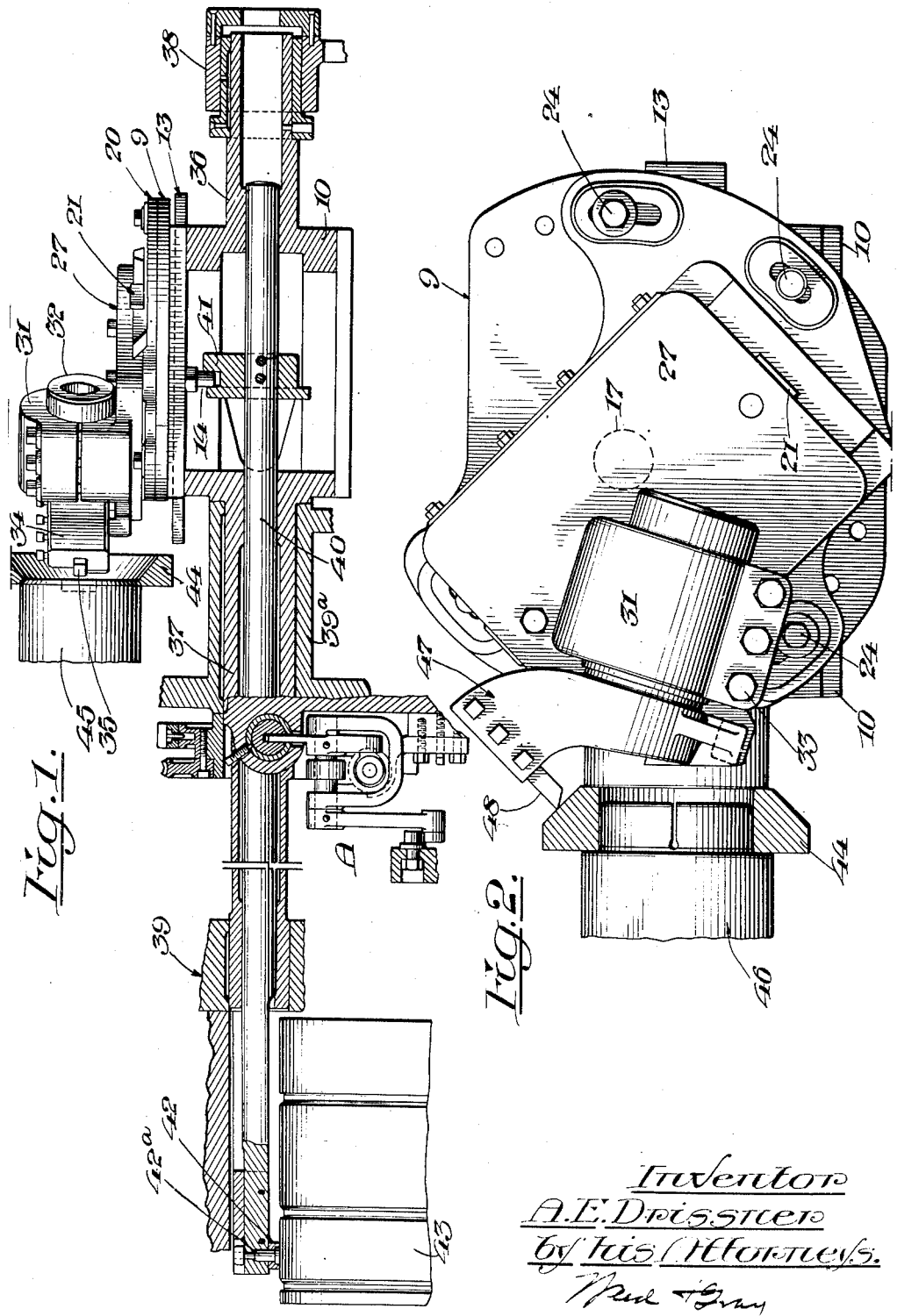

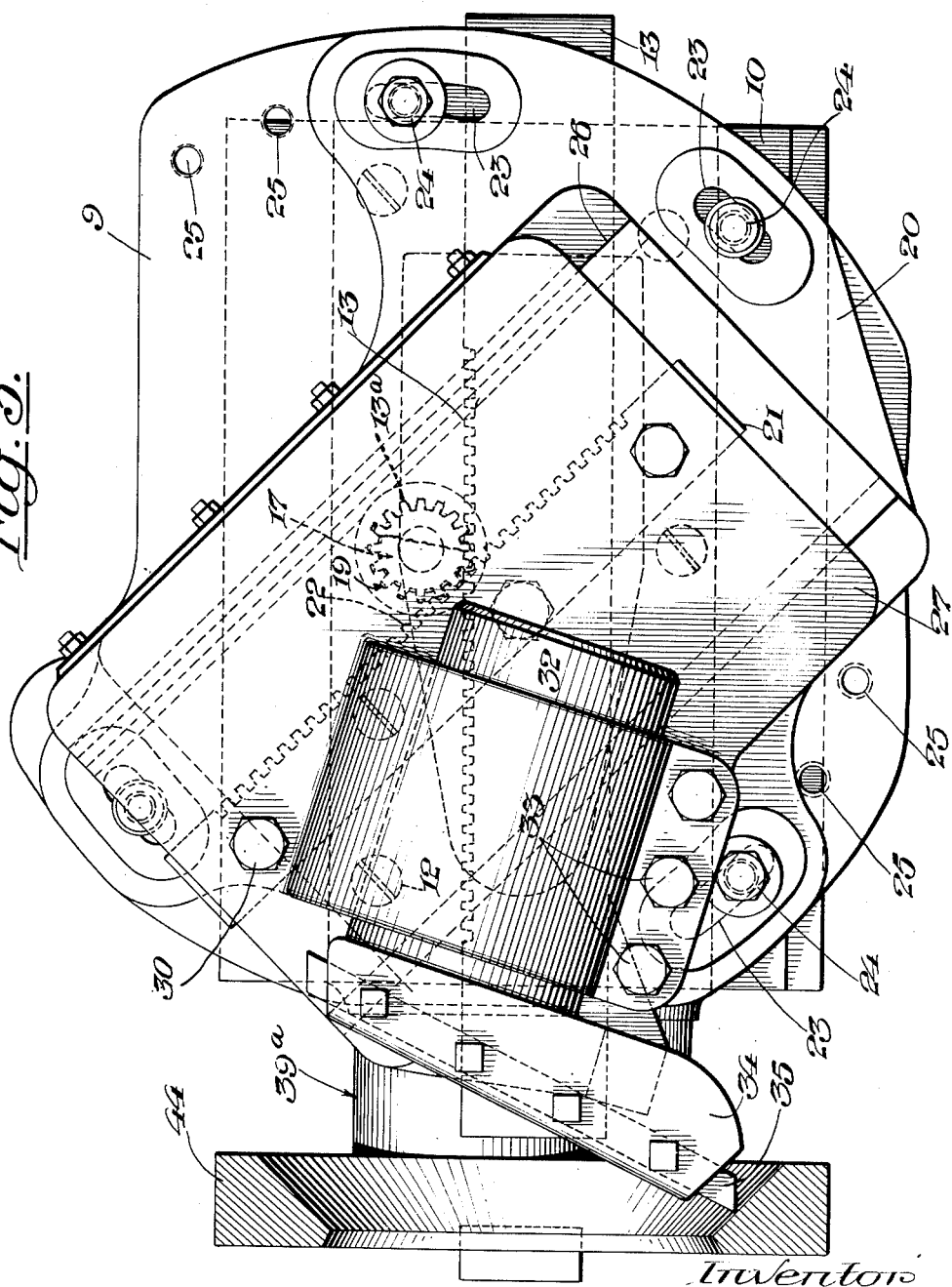

Oct. 26, 1926.

A. E. DRISSNER 1,604,115

TAPER TURNING AND BORING ATTACHMENT

Filed Dec. 11, 1924    3 Sheets-Sheet 3

Inventor
A. E. Drissner
by his Attorneys

Patented Oct. 26, 1926.

1,604,115

UNITED STATES PATENT OFFICE

ALFRED E. DRISSNER, OF CLEVELAND, OHIO, ASSIGNOR TO THE NATIONAL ACME COMPANY, OF CLEVELAND, OHIO, A CORPORATION OF OHIO.

TAPER TURNING AND BORING ATTACHMENT.

Application filed December 11, 1924. Serial No. 755,147.

This invention relates to tool slide mechanism adapted for use in various types of metal working machines, such as multiple and single spindle automatic screw machines, turret lathes, hand screw machines, etc., and particularly to a taper turning and boring attachment adapted to be carried by an indexible turret, an object of the invention being to provide mechanism for shifting the tools or tool slides carried by the indexible turret at different relative speeds, or for increasing the throw or travel of a tool slide relatively to the other slides carried by the turret. For instance, in the present invention, a cam operated member adapted to travel or reciprocate at a predetermined rate of speed is adapted to shift the various tool slides carried at the faces of the turret, and mechanism controlled by said member is provided for causing one or more of the tools or tool slides to travel at a greater speed than the speed of travel of such cam operated member. Normally, each tool slide will be shifted on the turret at the same speed and with the same throw as the cam operated member, but by virtue of this invention an increased speed and a greater throw may be imparted to any one of the tool slides. Such a construction and operation is especially advantageous in the case of taper boring or turning tools.

A further object of this invention is to provide an improved mechanism wherein the tool holder and its tool can be shifted for the purpose of cutting the work at various angles, so that as shown in the present case an inside or an outside taper at any desired angle may be cut in the work merely by adjusting the path of movement of the tool holder and without interfering with the operating mechanism therefor. In addition, where as in the present instance, a cam operated slide member is shiftable at a definite speed and with a definite range of movement for shifting the tool holder, the invention contemplates the provision of means effective to cause an increased speed or range of movement to be imparted to the tool holder by the operation of such slide member.

A further object of this invention is to provide improved mechanism adapted to be carried by the indexible turret of a metal working machine and effective to permit one of the tool holders carried by the turret to be shifted at a greater speed and with a greater throw than the other tool holders carried by the turret.

Other objects of this invention will appear in the following description and appended claims thereof, reference being had to the accompanying drawings forming a part of this specification wherein like reference characters indicate corresponding parts in the several views and wherein Fig. 1 is a fragmentary sectional view of a part of a machine illustrating my invention as applied thereto; Fig. 2 is a plan view illustrating my invention as utilized for outside turning; Fig. 3 is a plan view illustrating the mechanism as adapted for taper boring; and Fig. 4 is a sectional elevation taken through the turret and illustrating an embodiment of the invention.

Before explaining in detail the present improvement and mode of operation thereof, it is desired to have it understood that the invention is not limited to the details of construction and arrangement of parts which are illustrated in the accompanying drawings, since the invention is capable of other embodiments, and that the phraseology which is employed is for the purpose of description and not of limitation.

The present invention is adapted to be used in connection with various types of metal working machines, and in the present instance by way of example the mechanism is shown as applied to a Gridley single spindle automatic screw machine manufactured by the National Acme Company. In general the construction comprises a pair of supporting members adapted for instance to be mounted on the tool carrier or turret of the machine. One of the supporting members is provided with a slideway for receiving a tool carrying slide, and is angularly adjustable relatively to the other supporting member so that the tool slide may be shifted in different angularly related paths relatively to the work. The tool slide is adjustable about a pivot gear or pinion having a lower set of teeth meshing with a rack shifted by a cam operated slide member which is reciprocated at a definite speed. The pivot gear also has an upper set of teeth, which set has a greater number of teeth than the lower set and this upper set of teeth mesh with a rack secured to the tool slide in all angular positions of the tool slide. Thus the construction is such that the tool slide may be shifted in different directions or paths relatively to the work by the same operating means and with a greater speed and throw than that of the operating means, or cam operated slide member.

In the drawings wherein a present preferred embodiment of my invention is illustrated it will be seen that the mechanism comprises a base or supporting plate 9 constructed so as to extend into a recessed face 11 of the turret 10 and bolted at 12 to the turret. The under face of the base plate 9 is machined lengthwise thereof to receive a gear rack 13 which slides freely therein, the rack 13 having teeth 13ª formed at one side thereof. The rack 13 is tapped so as to receive a downwardly extending stud 14.

A hole of suitable diameter is drilled in the base plate 9 within which extends a bushing 15 which is held from turning by means of a pin 16. Within the bushing 15 is located a pivot gear or pinion 17, the central annular portion of the gear having a bearing against the inner face of the bushing 15.

The pivot gear is provided with two sets of teeth at opposite sides of the central bearing portion of the gear. The lower set of teeth 18 mesh with the teeth 13ª on the lower rack 13. An adjusting plate 20 is mounted upon the base plate 9 and is drilled to receive the bushing 15 and gear 17, the latter projecting above the top of the base plate 9. The upper set of teeth 19 of the pivot gear 17 mesh with the teeth 22 on an upper rack 21, the bushing 15 being cut away so as to permit the rack 21 to engage the upper set of teeth. The diameter of the lower set of teeth 18 is less than the diameter of the upper set of teeth, and the lower set 18 is provided with a less number of teeth than the upper set 19.

In the present instance, the difference in diameter of the lower and upper sets of teeth is represented by the depth of the offset or shoulder 15ª formed in the bushing 15, see Fig. 4. By utilizing different pivot gears 17, the number of teeth in the lower set 18 may be varied with relation to the number of teeth in the upper set so that in operation as hereinafter described, the speed of travel and range of movement of the upper rack 21 and the tool holder may be varied with relation to the lower rack 13.

The adjusting plate 20 is machined to receive the rack 21 which slides freely therein.

A plurality of slots 23 are machined in the adjusting plate 20 at suitable points and through each of these slots extends a screw 24 which extends into suitable tapped holes 25 in the base plate 9. A series of holes 25 spaced apart at suitable distances are provided for each of the screws 24 so that in adjusting the upper plate 20 on the base plate 9, each screw 24 may be secured in any one of the series of holes 25 provided therefor, and when the several screws are screwed down tightly the plates 20 and 9 will be securely held together in adjusted position.

A dovetail slide-way 26 is machined on the top surface of the adjusting plate 20 and is adapted to receive a dovetail slide 27, an adjusting gib 28 being interposed between the slide and slide-way and secured in position by means of a bolt 29. The upper gear rack 21 is bolted at 30 to the under face of the tool slide 27.

Mounted upon the slide 27 is a tool holder 31. In the present instance the tool holder and slide are cast integrally for the purpose of providing a strong and durable construction adapted for particular classes of work. It will be understood of course that the tool holder which clamps the tool in position may be separate from the slide and suitably secured thereto. The tool holder 31 is suitably drilled and bored to receive the shank 32 of the tool which is clamped thereto by means of bolts 33. In the construction illustrated in Figs. 1, 3 and 4, a boring tool 34 provided with a cutting member 35 is illustrated, and in Fig. 2 a turning tool 47 provided with a cutting member 48 is illustrated in position in the tool holder proper 31.

The tool turret 10 is provided with oppositely extending axial extensions 36 and 37, extension 36 having a suitable bearing in a bracket 38 of the machine frame, and extension 37 having suitable bearings at 39 and 39ª in the machine frame. A drawbar 40 passes through the turret 10 and its rearward extension 37, and extends over the lead cam drum 43 of the machine. This cam drum is mounted upon the cam shaft (not shown) of the machine and is provided with suitable cams (not shown) which engage at predetermined times a roller 42 mounted upon a stud 42ª secured to the rear end of the draw-bar 40. Adjacent to the front end of the draw bar 40 and within the housing of the turret is mounted an actuating member 41 which is fixed to the draw-bar by suitable pins. The actuator is machined on its outer periphery so as to receive the stud 14 of the lower gear rack 13. In the present instance the turret 10 is constructed at the four faces thereof for receiving suitable tool slide mechanism and the turret is rotatable within its bearings on the machine frame so as to permit the same to be indexed at proper times by the indexing mechanism of the machine.

The indexing and locking mechanism for the turret may be of any suitable construction and in part is generally illustrated at A in Fig. 1. A detailed description of this mechanism and a further detailed description of the cam means for operating the tool slide mechanism is not deemed necessary herein, the construction being shown in my copending application for automatic single spindle or turret lathes, Serial No. 520,287, filed December 6, 1921, now Patent No 1,567,790, dated December 29, 1925.

In the present construction a single tool slide is shown mounted on the indexible turret 10. The turret herein is provided with four recessed faces 11 by means of which tool slides of any desired nature may also be attached and mounted on the turret. Each of these tool slides may be provided with studs 14, so that after each indexing of the turret a stud of one of the tool slides or of the rack 13 will move into position to be engaged by the flanged actuator 41, whereupon the cam drum 43 at the proper time will operate the draw bar 40 to shift the tool carrier toward and from the work.

Normally the tool slide travels at the same speed as the speed of reciprocation of draw bar 40 and has the same throw or range of movement. By means of the rack and gear construction hereinbefore described, the travel of the tool slide 27 will be accelerated so that the throw thereof or range of movement will be multiplied with relation to the draw bar 40 and the other tools carried by the turret. The operation of the present invention will be readily understood. The rotation of the cam drum 43 by the cam shaft of the machine will cause the cams carried by the drum to reciprocate the draw bar 40 after each indexing of the turret 10. When the stud 14 and the lower gear rack 13 are shifted toward the work 44, which is carried in the revolving spindle 45 of the machine, the teeth 13ᵃ of the lower gear rack meshing with the lower set of teeth 18 of the pivot gear will rotate the gear. The upper set of teeth 19 being in mesh with the teeth 22 of gear rack 21 will shift the latter toward the work spindle and thereby the slide 27, tool holder and tool therewith, and causing the tool to operate on the work. The upper part of the pivot gear 17 having more teeth than the lower part will accelerate the movement of the gear rack 21 and will impart to the same a greater throw than that of the draw bar 40, and a greater throw than the normal throw of the tool slides carried by the turret.

The direction or path of movement of upper rack 21 will be determined by the angular adjustment of adjusting plate 20, the teeth of the upper rack always being in mesh with the pivot gear 17 irrespective of the angular adjustment of the rack and slide. It will be readily seen that the adjusting plate 20 can be turned or rotated about the pivot gear 17 at any angle up to 90° merely by loosening the screws 34 and turning the adjusting plate 20 together with bushing 15 about the bearing thereof on the pivot gear 17. The elongated holes or slots 23 in plate 20 are provided for the purpose of obtaining short or minute angular adjustments, the spaced holes 25 in the lower plate 9 being used initially for approximate adjustment. Thus when the operator sets up the mechanism for the purpose of cutting a taper in the work at a predetermined angle he removes the screws 24 and turns the adjusting plate 20 until he obtains the approximate cutting angle desired, then inserting the screws 24 in the slots so as to extend into the nearest holes 25. Thereupon in order to obtain the exact adjustment the adjusting plate 20 is moved to the correct angle and the screws securely tightened in position.

Where it is desired to cut an outside taper on the work, tool members 47 and 48 are placed in the tool holder as illustrated in Fig. 2, and where taper boring is to be done tool members 34 and 35 are placed in the tool holder 31 as illustrated in Figs. 1, 3 and 4. In either form the tool may be utilized either for straight cutting or for taper cutting depending upon the adjustment of the slide members 20 and 27 with respect to the base plate 9.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. In a metal working machine, the combination of an axially supported indexible supporting means, means for indexing it, a tool holder slidably carried thereby, a sliding member shiftable relatively to said supporting means, means operated by said sliding member for shifting the tool holder relatively to the work at a different speed than said sliding member, and axially located means for pulling said sliding member and thereby the tool holder toward the work.

2. In a metal working machine, the combination of an axially supported indexible non-sliding supporting means, means for indexing it, an angularly adjustable tool holder slidably carried thereby, means for adjusting the tool holder angularly relatively to said supporting means, a sliding member shiftable relatively to said supporting means, means operated by said sliding member for shifting the tool holder relatively to the work at a different speed than said sliding member, and axially located means for pulling said sliding member and thereby the tool holder toward the work.

3. In a metal working machine, the combination of an axially supported indexible supporting means, means for indexing it, a tool holder slidably carried thereby, a reciprocating operating member located axially of and shiftable relatively to said supporting means, means for reciprocating said member, and mechanism operated by said reciprocating member for shifting the tool holder relatively to the work and for imparting a different speed to the tool holder than that of said reciprocating operating member.

4. In a metal working machine, the combination of an axially supported indexible supporting means, means for indexing it, a tool holder slidably carried thereby, a reciprocating operating member located axially of and shiftable relatively to said supporting means, means for reciprocating said member, and gear and rack mechanism operated by said reciprocating member for shifting the tool holder relatively to the work and for imparting a greater speed to the tool holder than that of said reciprocating member.

5. In a metal working machine, the combination of an axially supported indexible supporting means, means for indexing it, an angularly adjustable tool holder slidably carried thereby, means for adjusting said tool holder angularly relatively to said supporting means, a reciprocating operating member located axially of and shiftable relatively to said supporting means, mechanism operated by said reciprocating member for shifting the tool holder relatively to the work and for imparting a greater speed to the tool holder than that of said reciprocating member, and cam means for operating said reciprocating member thereby to pull the tool holder toward the work.

6. In a metal working machine, the combination of an indexible turret having means for attaching tool slides at a plurality of faces thereof, a tool slide carried at one face of the turret, an operating member shiftable relatively to the turret, mechanism operated thereby for shifting said tool slide relatively to the work at a greater speed than said operating member, and means for shifting said member.

7. In a metal working machine, the combination of an indexible turret having means for attaching tool slides at a plurality of faces thereof, a tool slide carried at one face of the turret, a reciprocating operating member shiftable relatively to the turret, gear and rack mechanism operated thereby for shifting said tool slide relatively to the work at a greater speed than said operating member, and cam means for shifting said member.

8. In a metal working machine, the combination of an indexible turret having means for attaching tool slides at a plurality of faces thereof, a tool slide carried at one face of the turret, an operating member shiftable relatively to the turret, mechanism operated thereby for shifting said tool slide relatively to the work at a greater speed than said operating member, means for shifting said member, and means for angularly varying the path of movement of said tool slide.

9. In a metal working machine, the combination of a work holder, an indexible tool holder, means for indexing it, means for supporting said holders to permit one to shift toward and from the other, an operating member shiftable relatively to said supporting means for pulling the shiftable holder toward the other, and mechanism operated by said operating member for shifting one of said holders relatively to the other at a different speed than said operating member.

10. In a metal working machine, the combination of a work holder, an indexible tool holder, means for indexing it, means for supporting said holders to permit one to shift toward and from the other, means for angularly varying the path of movement of said shiftable holder, an operating member shiftable relatively to said supporting means for pulling the shiftable holder toward the other, and gear and rack mechanism operated by said operating member for shifting one of said holders relatively to the other at a greater speed than said operating member.

11. In a metal working machine, the combination of an indexible tool support adapted to carry upon its side faces a plurality of shiftable tools, means for indexing it, a tool slide mounted on one of the faces of said support, a tool holder carried by said slide, reciprocating means adapted to successively shift the tools, and means connecting said reciprocating means with said tool slide whereby said tool slide and its holder are shifted at a different speed than the other of said tools.

12. In a metal working machine, the combination of an indexible tool support adapted to carry upon its side faces a plurality of shiftable tools, means for indexing it, an angularly adjustable tool slide mounted on one of the faces of said support, a tool holder carried by said slide, reciprocating means adapted to successively shift the tools, and means connecting said reciprocating means with said tool slide whereby said tool slide and its holder are shifted at a greater speed than the other of said tools and comprising a pair of racks and gear means having two sets of gear teeth of different ratio.

13. In a metal working machine, the combination of an indexible turret adapted to carry a plurality of sliding tools, means extending into said turret for shifting all of said tools, a tool slide carried by the turret, and means connecting said means and slide whereby a different speed of travel is imparted to the slide than to the other tools.

14. In a metal working machine, the combination of a non-slidable tool carrying turret, an angularly adjustable tool slide carried thereby, a rack connected thereto, a shiftable rack located below said first rack, gearing meshing with said racks, and means reciprocating relatively to said turret and located below said shiftable rack for shifting said last rack, said gearing having a greater number of teeth meshing with one rack than the other thereby to shift one rack at a different speed than the other.

15. In a metal working machine, the combination of an indexible turret having means for carrying a plurality of tool holders, a shiftable tool holder carried thereby, a cam operated member shiftable at a predetermined speed, and means controlled by said member for shifting the tool holder at a greater speed than the speed of travel of said member.

16. In a metal working machine, the combination of an indexible turret having means for carrying a plurality of tool holders, a shiftable tool holder carried thereby, a cam operated member shiftable at a predetermined speed, means controlled by said member for shifting the tool holder at a greater speed than the speed of travel of said member, and means for angularly adjusting the path of movement of said tool holder.

17. In a metal working machine, the combination of an indexible turret having means for carrying a plurality of tool slides, a tool slide carried thereby, means for angularly adjusting said slide, a common means for shifting all of said tool slides, and means adapted to be connected to said means for shifting said angularly adjustable slide at a different speed than the speed of travel imparted to the other tool slides carried by the turret.

18. In a metal working machine, the combination of an indexible turret having means for carrying a plurality of tool slides, a tool slide carried thereby, means for angularly adjusting said slide, a reciprocating drawbar extending into the turret for shifting all of said tool slides, and means adapted to be connected to said bar for imparting to said angularly adjustable slide a greater throw than that imparted to the other tool slides carried by the turret.

19. In a metal working machine, the combination of a work holder, a tool support having means for carrying a plurality of tool slides, a tool slide, means for angularly adjusting said tool slide to permit the same to be shifted in different angularly related paths, means operative to shift all of the slides carried by said support and to shift said angularly adjustable slide at a different speed than the others.

20. In a metal working machine, the combination of an indexible turret supported for rotation on a horizontal axis and effective to simultaneously support tools on its several side faces, an angularly adjustable slide carried by one of said faces, a tool holder carried by said slide, a reciprocating operating member shiftable relatively to said turret for successively shifting the tools, means for reciprocating said operating member, a shiftable rack operated by said reciprocating member, a rack connected to said tool holder slide, and gear means having a different number of teeth meshing with said first rack than the second rack thereby to shift one rack at a different speed than the other.

21. In a metal working machine, the combination of an indexible turret supported for rotation on a horizontal axis and effective to simultaneously support tools on its several side faces, an angularly adjustable slide carried by one of said faces, a tool holder carried by said slide, a reciprocating operating member shiftable relatively to said turret for successively shifting the tools, means for reciprocating said operating member, a shiftable rack operated by said reciprocating member, a rack connected to said tool holder slide, a pivot gear supported in position to mesh with said racks, and means for adjusting said tool holder slide angularly relatively to said turret and about the axis of said pivot gear, said pivot gear having a different number of teeth meshing with one rack than with the other rack thereby to shift one rack at a different speed than the other.

22. In a metal working machine, the combination of a work holder, a turret, a tool support carried by said turret, an angularly adjustable tool carrying slide carried by said support and adjustable into different positions to permit the same to slide in different paths, reciprocating means for operating said tool slide and located axially of the turret, means operated by said reciprocating means and comprising a rack shiftable relatively to said tool support and in a fixed straight path coinciding with the path of movement of said reciprocating means, a rack secured to said tool slide, and gear means comprising a different number of teeth meshing with one rack than the other thereby to shift one rack at a different speed than the other.

23. In a metal working machine, the combination of a non-sliding tool carrying turret, a tool slide carried thereby, a rack connected thereto, a shiftable rack located below said first rack, gearing meshing with said racks, and means reciprocating relatively to said turret and located below said shiftable rack for shifting said last rack, said gearing having a greater number of teeth meshing with one rack than the other thereby to shift one rack at a different speed than the other.

Signed at Cleveland, Ohio, this 8th day of December, 1924.

ALFRED E. DRISSNER.